US008538435B2

(12) United States Patent  
Immendorf et al.

(10) Patent No.: US 8,538,435 B2
(45) Date of Patent: Sep. 17, 2013

(54) SYSTEMS AND METHODS FOR AUTONOMOUSLY DETERMINING NETWORK CAPACITY AND LOAD BALANCING AMONGST MULTIPLE NETWORK CELLS

(75) Inventors: Chaz Immendorf, Mill Creek, WA (US); Jeffrey Harrang, Sammamish, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 597 days.

(21) Appl. No.: 12/713,055

(22) Filed: Feb. 25, 2010

(65) Prior Publication Data

US 2010/0214943 A1 Aug. 26, 2010

Related U.S. Application Data

(60) Provisional application No. 61/155,341, filed on Feb. 25, 2009.

(51) Int. Cl.
*H04W 36/00* (2009.01)
*H04W 36/30* (2009.01)

(52) U.S. Cl.
CPC .................................. *H04W 36/30* (2013.01)
USPC ...................... 455/436; 455/452.21

(58) Field of Classification Search
CPC ...................................................... H04W 36/30
USPC .................................. 455/436, 452.21
See application file for complete search history.

(56) References Cited

U.S. PATENT DOCUMENTS

| | | | |
|---|---|---|---|
| 5,542,098 A * | 7/1996 | Bonta | 455/434 |
| 5,781,861 A | 7/1998 | Kang et al. | |
| 5,912,884 A | 6/1999 | Park et al. | |
| 6,459,894 B1 * | 10/2002 | Phillips et al. | 455/424 |
| 7,729,262 B2 * | 6/2010 | Crandall et al. | 370/238 |
| 2002/0080727 A1 * | 6/2002 | Kim et al. | 370/252 |
| 2003/0153315 A1 * | 8/2003 | Gunreben et al. | 455/445 |
| 2005/0097161 A1 * | 5/2005 | Chiou et al. | 709/200 |
| 2006/0084445 A1 * | 4/2006 | Minami et al. | 455/452.1 |
| 2007/0087751 A1 * | 4/2007 | Voyer et al. | 455/436 |
| 2009/0106064 A1 * | 4/2009 | Egner et al. | 705/7 |
| 2010/0214943 A1 * | 8/2010 | Immendorf et al. | 370/252 |

FOREIGN PATENT DOCUMENTS

| KR | 10-2000-0033952 A | 4/2002 |
|---|---|---|
| KR | 10-2005-0031548 B1 | 9/2006 |

OTHER PUBLICATIONS

International Search Report and Written Opinion for PCT/US10/25440 filed on Feb. 25, 2010.

* cited by examiner

*Primary Examiner* — Ricky Ngo
*Assistant Examiner* — Phuongchau B Nguyen (57) ABSTRACT

A networked computing system including multiple network base stations, user equipment, a network resource controller (NRC), and a data communications network facilitating communications amongst all devices of the networked computing system. The NRC determines a current radio channel available capacity based on a user load associated with regional user equipment, and then forecasts a maximum radio channel capacity based on the current radio channel available capacity. The NRC may be a network base station and it may determine a number of additional user equipment it can support as a component of the forecast maximum radio channel capacity. The NRC/base station may be further configured to determine a handover threshold utilizing the forecast maximum radio channel capacity, and when the NRC base station's number of users exceeds the handover threshold, one or more user equipment may be handed over to a second network base station with better service capacity.

14 Claims, 8 Drawing Sheets

SYSTEMS AND METHODS FOR AUTONOMOUSLY DETERMINING NETWORK CAPACITY AND LOAD BALANCING AMONGST MULTIPLE NETWORK CELLS

CROSS REFERENCE TO RELATED APPLICATIONS

The present application claims the benefit of U.S. Provisional Application No. 61/155,341, filed Feb. 25, 2009.

FIELD OF THE INVENTION

The field of the present invention generally relates to emerging 4G self-organized networks (SoN networks), where manual intervention on the part of service providers can be significantly reduced or eliminated as a result of employing improved radio resource allocation solutions. More specifically, the systems and methods of the present invention relate to forecasting radio channel capacities for regional network cells in order to affect service handovers.

BACKGROUND OF THE INVENTION

In modern homogeneous and heterogeneous cellular network topologies, large numbers of base stations, operating on similar, licensed frequency spectra, are being utilized by network access providers to accommodate a growing demand for increased network capacity. In networks where neighboring network cells have significant, overlapping wireless coverage areas, it is particularly important for service providers to be able to accurately determine which network resources should be allocated to handle various service assignment tasks for particular groups of network subscribers residing within the overlapping coverage areas. Subscriber diversity in this context can lead to unique network resource consumption patterns amongst regional network areas where traffic densities may vary widely throughout the course of any particular day on a time-varying basis.

Further, commercial cellular deployments are increasingly being used to provide a larger breadth of digital communications services to various types of distributed network clientele. For example, many users in particular regions of a network have access to relatively high network throughput service, associated with enhanced data-rate plans (high bandwidth access provider service offerings). These users may utilize local network resources to transfer large amounts of Internet-based data to and from their cellular communications device(s) over the course of a single day. Other wireless subscribers, with lesser available network service, may use local network resources primarily for voice data communications. As would be understood by those skilled in the Art, network throughput is generally defined as an average rate of successful data communications delivery over a particular network communication channel per unit of time. This throughput is usually measured in bits per second (bps) or alternately in data packets per second.

In modern wireless communications networks, it is particularly important for service providers to be able to accurately predict or forecast their regional service subscribers' network resource consumption patterns, in order to be able to effectively determine which network users should be assigned to various overlapping serving cells within particular network sectors at specific times during a day, as network traffic loads fluctuate. In light of this user load variance, improved radio channel capacity assignment and network resource allocation solutions are becoming crucial instruments that service providers must utilize to compensate for a dynamically changing demands of service capacity, caused by network subscriber diversity and associated bandwidth consumption habits in various regions of a data communications network.

Service capacity, as viewed in this context, generally refers to the number and type of users that a network cell's limited radio resources (e.g., a radio channel(s), backhaul link, processing unit(s), scheduler, etc.) can support while providing expected levels of service to its subscribers (e.g., as designated in service level agreements for active network users). As will be made more apparent herein, network capacity, while simple in concept, often depends on a complex and large sets of dynamically changing factors that can be cumbersome to calculate and difficult for service providers to accurately predict using existing methods for modeling capacity planning solutions, and largely manual, radio resource compensation techniques.

As the number of active users in a particular wireless communications network increase, it becomes more and more important to properly manage radio frequency resources that are shared amongst regional network cells, particularly in networks employing frequency reuse assignment (e.g., a majority of LTE™, LTE Advanced™, GSM™, UMTS™, and Wi-Max™ based networks). By way of example, cells with overlapping coverage areas might share a fixed number of wireless communication channels, and on any given day, a particular network cell may experience detrimentally reduced network capacity, based on heavy subscriber usage of its limited network resources (e.g., available communications channel bandwidth). This heavy resource usage may correspond with a particular time of day, geographic location, serving cell technology, aggregate network user type(s), etc.

Therefore, it would be desirable to be able to more efficiently allocate network resources amongst multiple regional network resources (e.g., neighboring network base stations) having overlapping coverage areas, depending on actual and/or expected (forecast) usage demand for each local network resource. This would help to reduce network congestion problems at overburdened network cells, and it would accordingly also improve a network service provider networks' Quality of Service (QOS) as well as network service subscribers' collective Quality of Experience (QOE) within high traffic areas of a data communications network. Negative effects associated with poor QOS and poor QOE (e.g., conditions largely caused by congestion and/or interference), which can be mitigated by optimizing network resource allocation using improved network resource allocation processes, may include: queuing delay, data loss, as well as blocking of new and existing network connections for certain network subscribers.

Prior network resource allocation solutions do not adequately account for network capacity relating to aggregate network subscriber usage metrics. Existing static channel assignment and network resource allocation solutions may fail to adequately provision a network, such that congestion in areas of cell coverage can occur during peak usage periods (e.g., hourly periods with high traffic loading). Further, these existing solutions must err on the conservative side in order to reduce the probability of congestion and co-channel interference between and amongst neighboring network cells. This can lead to situations where too few network resources are allocated in high traffic areas amongst a cluster of network base stations. In these scenarios, a service provider entity or network controller may not react quickly enough to avoid or largely mitigate various detrimental traffic overload scenarios. Existing dynamic channel assignment and network allocation solutions similarly allocate a pool of available communications channels based on short-sighted estimations of regional traffic patterns that are largely generic (e.g., high-level models, incorporating limited samples of real-world network resource consumption data) and do not factor in a sufficient number of variables relating to actual network usage, in order to adequately maximize network resource usage amongst clusters of overlapping network cells.

Accordingly, there remains a need for systems and methods that employ improved network resource allocation solutions that better compensate for user equipment loading trends at one or more network base stations. It would be helpful if these solutions accounted for both regional traffic loading patterns and actual resource consumption for various network subscriber types in specific network sectors of interest (e.g., in areas of overlapping network service). In this way, it would be easier for service providers to readily allocate network resources to network service subscribers in a time efficient manner, in dynamically changing network environments. It would also be helpful if these solutions took advantage of existing network resources, such that various network cells could autonomously determine their present user capacity and forecast their residual available user capacity based on their determined user capacity and/or historical user capacity information. In this scenario, it would also be advantageous if neighboring network cells could frequently communicate amongst each other to keep track of overlapping cell available capacities, in order to affect handover determinations and automatically balance network loads amongst regional network areas to improve a network's QOS and QOE metrics. These improved network optimization solutions would effectively reduce the level of required human intervention for successful network resource allocation operations. This in turn would result in operational savings for service providers, and it would provide for many other performance, quality, and operational benefits. The importance of these benefits would be readily understood by those familiar with the multitude of benefits commonly associated with self-organized network (SoN) solutions.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with modern radio resource planning and management techniques utilized in cellular networks, the present invention discloses systems and methods for determining present and forecast radio channel capacities of regional network base stations in order to optimally affect service handovers amongst a service provider's distributed network resources. In an embodiment, the present invention discloses a networked computing system including multiple network base stations, multiple user equipment, one or more network resource controller(s), and a data communications network facilitating data communications amongst the network base stations, the user equipment, and the network resource controller(s). The network resource controller may be configured to determine a current radio channel available capacity based on a user load associated with regional user equipment, and then forecast maximum radio channel capacity based on the current radio channel available capacity.

In accordance with another aspect of the present invention, the forecast maximum radio channel capacity may be related to a predicted number of network users that the network base station will provide service to.

In accordance with a further aspect of the present invention, the network resource controller may be further configured to determine a number of additional user equipment a network base station can support, based on the forecast maximum radio channel capacity.

In accordance with another aspect of the present invention, the user load associated with the regional user equipment may be related to network resource consumption habits of an average network user that a network base station services.

In accordance with yet another aspect of the present invention, the network resource controller may be further configured to determine a handover threshold (alternately referred to herein as a forecast limit) utilizing the forecast maximum radio channel capacity.

In accordance with a further aspect of the present invention, when a first network base station's number of users exceeds the handover threshold/forecast limit, one or more user equipment that the first network base station services, may be handed over to a second network base station with better service capacity.

In accordance with another aspect of the present invention, the network resource controller may be further configured to utilize the forecast maximum radio channel capacity to determine if a network base station should increase or decrease a radio operating level to add or drop service to one or more user equipment.

In accordance with a further aspect of the present invention is a computer-readable medium encoded with computer-executable instructions for determining the radio channel capacities of regional network base stations to affect service handovers, which when executed, performs a method comprising the following processes: determining a current radio channel capacity of a network base station based on a user load associated with regional user equipment, and then forecasting available radio channel capacity based on the current radio channel capacity.

In accordance with yet another aspect of the present invention, is a computer-implemented method for determining the radio channel capacities of regional network base stations to affect service handovers, the method including the following processes: determining a current radio channel capacity of a network base station based on a user load associated with regional user equipment, and then forecasting available radio channel capacity based on the current radio channel capacity.

BRIEF DESCRIPTION OF THE DRAWINGS

Preferred and alternative examples of the present invention are described in detail below with reference to the following Figure drawings.

DETAILED DESCRIPTION

Figure 1:
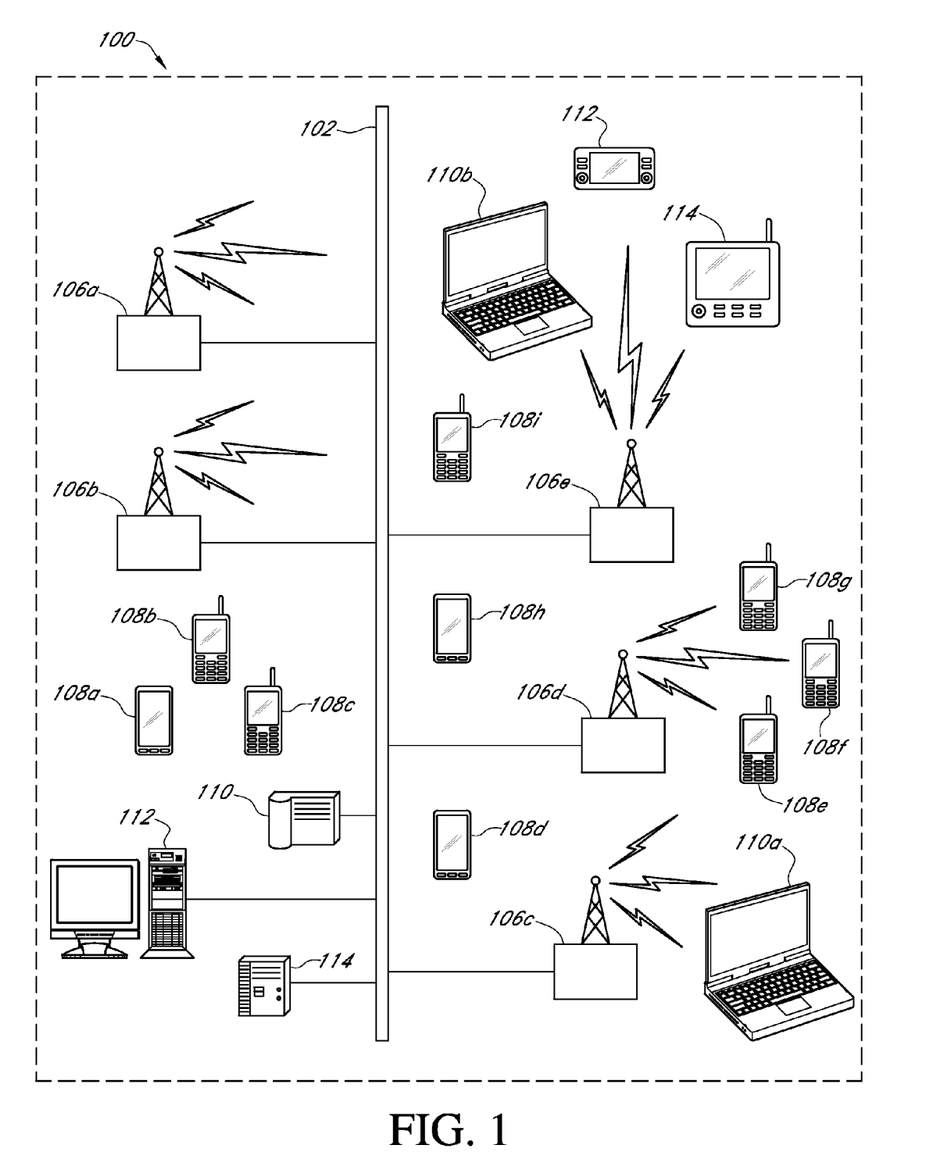
FIG. 1 illustrates a perspective view of a distributed data communications network, in accordance with an embodiment of the present invention.

In accordance with an exemplary embodiment of the present invention, FIG. 1 illustrates a network computing system 100 including various wireline and wireless computing devices that may be utilized to implement any of the radio channel available capacity, forecast maximum radio channel available capacity, neighboring cell negotiation, and network handover processes associated with various embodiments of the present invention. The networked computing system 100 may include, but is not limited to, a group of service provider controller devices 110, 112, and 114 (also referred to here as Network Resource Controllers or NRCs); network base stations 106*a-e* that may include NRC functionality and may have overlapping wireless coverage with one or more neighboring base stations within a particular region of the networked computing system 100; multiple user equipment, including: cell phone/PDA devices 108*a-i*, laptop/netbook computers 110*a-b*, handheld gaming units 112, electronic book devices 114, and any other type of common portable wireless computing device known in the Art that may be provided wireless communications service by any of the network base stations 106*a-e*; and a data communications network 102, including a backhaul portion that can facilitate distributed network communications between any of the network controller devices 110, 112, and 114 and any of the network base stations 106*a-e*.

As would be understood by those skilled in the Art, in most digital communications networks, the backhaul portion of a data communications network 102 may include the intermediate, generally wireline, links between a backbone of the network, and the sub-networks or network base stations 106*a-e* located at the periphery of the network. For example, cellular user equipment (e.g., any of user equipment 108*a-i*, 110*a-b*, 112, and 114) communicating with one or more network base stations 106*a-e* may constitute a local sub-network. Whereas the network connection between any of the network base stations 106*a-e* and the rest of the world initiates with a link to the backhaul portion of an access provider's communications network 102 (e.g., via a point of presence).

In an embodiment, any of the service provider controller devices 110, 112, and 114, and/or network base stations 106*a-e* (optionally having NRC functionality) may function independently or collaboratively to implement any of the radio channel available capacity, forecast maximum radio channel available capacity, neighboring cell negotiation, and network handover processes associated with various embodiments of the present invention. Further, any of the radio channel available capacity, forecast maximum radio channel available capacity, neighboring cell negotiation, and network handover processes may be carried out by any number of common communications technologies known in the Art, such as those technologies common to modern Global Systems for Mobile (GSM), Universal Mobile Telecommunications System (UMTS), and Long Term Evolution (LTE) network infrastructure. In accordance with a standard GSM network, any of the service provider controller devices 110, 112, and 114 may be associated with a base station controller (BSC), a mobile switching center (MSC), or any other common service provider control device known in the art, such as a radio resource manager (RRM). In accordance with a standard UMTS network, any of the service provider controller devices 110, 112, and 114 may be associated with a network resource controller (NRC), a serving GPRS support node (SGSN), or any other common service provider controller device known in the art, such as a radio resource manager (RRM). In accordance with a standard LTE network, any of the service provider controller devices 110, 112, and 114 may be associated with an eNodeB base station, a mobility management entity (MME), or any other common service provider controller device known in the art, such as a radio resource manager (RRM).

In an embodiment, any of the service provider controller devices 110, 112, and 114, the network base stations 106*a-e*, as well as any of the user equipment 108*a-i*, 110*a-b*, 112, and 114 may be configured to run any well-known operating system, including, but not limited to: Microsoft® Windows®, Mac OS®, Google® Chrome®, Linux®, Unix®, or any well-known mobile operating system, including Symbian®, Palm®, Windows Mobile®, Google® Android®, Mobile Linux®, MXI®, etc. In an embodiment, any of the service provider controller devices 110, 112, and 114, or any of the network base stations 106*a-e* may employ any number of common server, desktop, laptop, and personal computing devices.

In an embodiment, any of the user equipment 108*a-c*, 110*a-b*, 112, and 114 may include any combination of common mobile computing devices (e.g., laptop computers, net book computers, cellular phones, PDAs, handheld gaming units, electronic book devices, personal music players, MiFi™ devices, video recorders, etc.), having wireless communications capabilities employing any common wireless data commutations technology, including, but not limited to: LTE™, LTE Advanced™, GSM™, UMTS™, and Wi-Max™, etc.

In an embodiment, the backhaul portion of the data communications network 102 of FIG. 1 may employ any of the following common communications technologies: optical fiber, coaxial cable, twisted pair cable, Ethernet cable, and powerline cable, along with any wireless communication technology known in the art. In an embodiment, any of the service provider controller devices 110, 112, and 114, the network base stations 106*a-e*, and user equipment 108*a-i*, 110*a-b*, 112, and 114, may include any standard computing software and hardware necessary for processing, storing, and communicating data amongst each other within the networked computing system 100. The computing hardware realized by any of the network computing system 100 devices (e.g., any of devices 106*a-e*, 108*a-i*, 110*a-b*, 112, and 114) may include, but is not limited to: one or more processors, volatile and non-volatile memories, user interfaces, transcoders, modems, wireline and/or wireless communications transceivers, etc.

Further, any of the networked computing system 100 devices (e.g., any of devices 106*a-e*, 108*a-i*, 110*a-b*, 112, and 114) may include one or more computer-readable media (e.g., any common volatile or non-volatile memory type) encoded with a set of computer readable instructions, which when executed, performs a portion of any of the radio channel available capacity, forecast maximum radio channel available capacity, neighboring cell negotiation, and network handover processes associated with various embodiments of the present invention.

In context with various embodiments of the present invention, it should be understood that wireless communications coverage associated with various data communication technologies (e.g., network base stations 106a-e) typically vary amongst different service provider networks based on the type of network and the system infrastructure deployed within a particular region of a network (e.g., differences amongst LTE™, LTE Advanced™, GSM™, UMTS™, and Wi-Max™ based networks and the technologies deployed in each network type).

Figure 2:
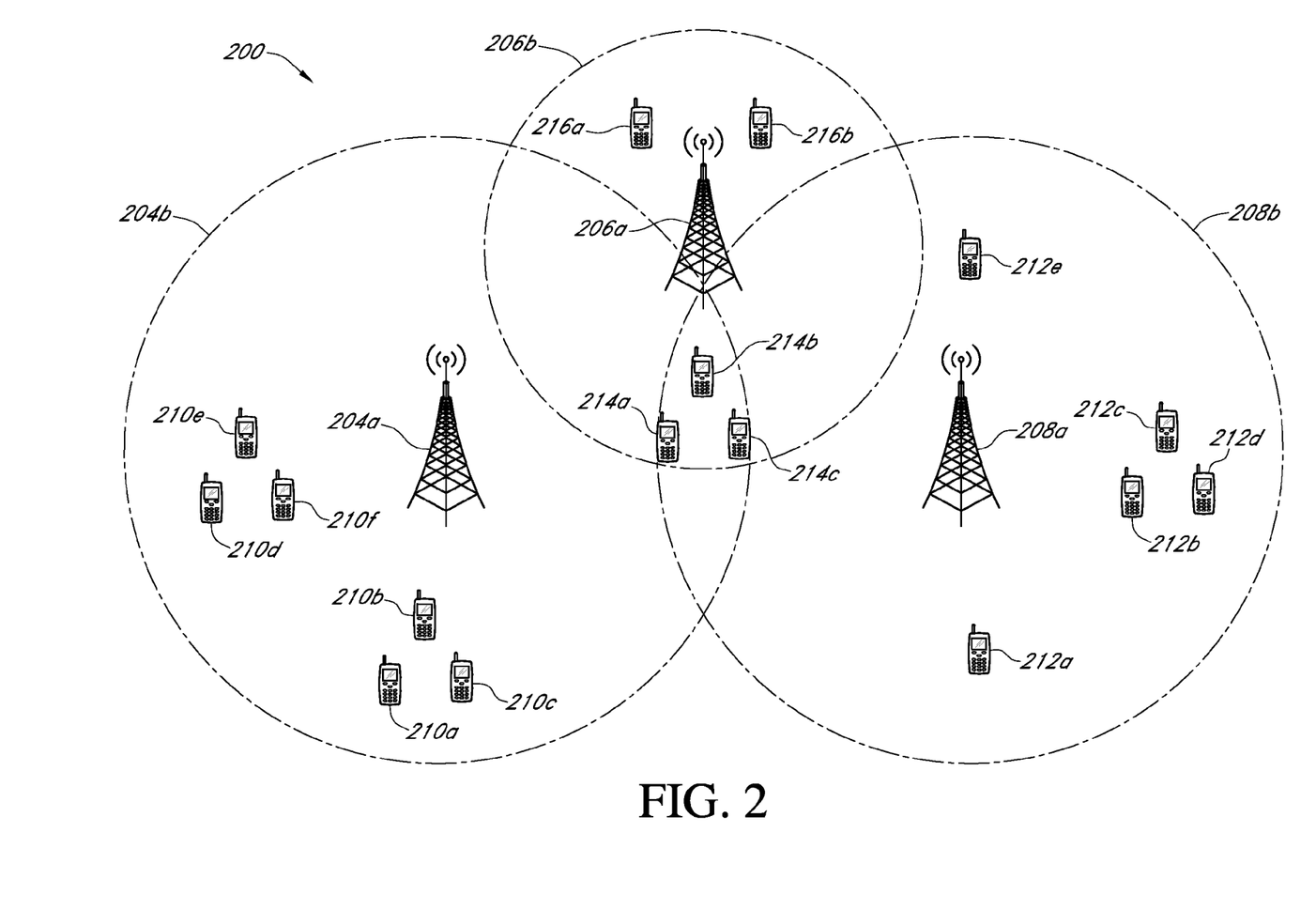
FIG. 2 illustrates a network topology comprising various network base stations and various user equipment geographically positioned amongst the network base stations, in accordance with an embodiment of the present invention.

FIG. 2 illustrates a network topology 200 including various network base stations 204a, 206a, and 208a having overlapping coverage areas 204b, 206b, and 208b that may be part of a larger data communications network, as well as various user equipment 210a-f, 212a-e, 214a-c, and 216a-b that may be geographically located within the respective coverage areas 204b, 206b, and 208b of any of network base stations 204a, 206a, and 208a. The network base stations 204a, 206a, and 208a and user equipment 210a-f, 212a-e, 214a-c, and 216a-b depicted in FIG. 2 may be representative of any of the network base stations 106a-e or user equipment 108a-i, 110a-b, 112, and 114 depicted in FIG. 1.

In an embodiment, the network topology 200 may be consistent with, but is not limited to, any common LTE™, LTE Advanced™, GSM™, UMTS™, and/or Wi-Max™ based network topology. In particular, the network topology 200 depicts overlapping cell coverage areas amongst various network cells (e.g., homogeneous or heterogeneous mixtures of network cells) and various user equipment 210a-f, 212a-e, 214a-c, and 216a-b that are independently distributed within the coverage areas 204b, 206b, and 208b of multiple network base stations 204b, 206b, and 208b. In an embodiment, user equipment 210a-f, which may be representative of any of the user equipment 108a-e, 110a-b, 112, and 114 of FIG. 1, is geographically positioned solely within the cell coverage area 204b of network base station 204a; user equipment 212a-e, which may be representative of any of the user equipment 108a-e, 110a-b, 112, and 114 of FIG. 1, is geographically positioned solely within the cell coverage area 208b of network base station 208a; and user equipment 216a-b, which may be representative of any of the user equipment 108a-e, 110a-b, 112, and 114 of FIG. 1, is geographically positioned solely within the cell coverage area 206b of network base station 206a. In contrast, user equipment 214a-c, which may be representative of any of the user equipment 108a-e, 110a-b, 112, and 114 of FIG. 1, is geographically positioned within each of the cell coverage areas 204b, 206b, and 208b of network base stations 204a, 206a, and 208a.

In this scenario, various service provider controller devices 110, 112, and 114 (e.g., NRCs, not shown) and/or any of network base stations 204a, 206a, and 208a (optionally having NRC functionality) may be configured to perform a portion of any of the radio channel available capacity, forecast maximum radio channel available capacity, neighboring cell negotiation, and network handover processes associated with various embodiments of the present invention. In an embodiment, radio channel available capacity determinations may require any of the network base stations 204a, 206a, and 208a to determine their individual user loads (e.g., associated with aggregate user types having varying bandwidth consumption trends) associated with all user equipment (e.g., any of user equipment 210a-f, 212a-e, 214a-c, and 216a-b) they are actively servicing at a particular point in time. In accordance with an embodiment, forecast maximum radio channel available capacity determinations may require any of the network base stations 204a, 206a, and 208a to determine their individual user loads (e.g., associated with aggregate user types having varying bandwidth consumption trends) associated with all user equipment (e.g., any of user equipment 210a-f, 212a-e, 214a-c, and 216a-b) they are actively servicing at a particular point in time as well as their historical user loads (e.g., associated with aggregate user types having varying bandwidth consumption trends) associated with past user loads over various periods of time. In an embodiment, neighboring cell negotiation determinations may require any pair or group of network base stations 204a, 206a, and 208a having overlapping coverage to communicate amongst each other to autonomously determine each network base station's service capacity, to facilitate network handovers. In an embodiment, any of network base stations 204a, 206a, and 208a may be configured to maintain, shrink, or grow its respective network coverage area 204b, 206b, and 208b, to affect various network handover decisions, discussed further herein.

As would be understood by those skilled in the Art, a cellular "handover" may generally be defined as the changing of a subscriber device's (e.g., a user equipment) access connection from one base station to another, generally under the direction of a service provider controller device (e.g., a NRC). Network handovers may occur as the result of moving user equipment, which leave the coverage area of one network cell and enters the coverage area of another network cell. Other times, network handovers may occur as the result of network traffic loading. For example, when a serving base station is experiencing or is anticipated to experience an unusually heavy traffic load, a network controller device may direct the user equipment being served by one base station to switch to another base station (generally having more capacity that the previous serving cell), where a particular user equipment is located. These handovers may be made so that all of a network cell's active subscribers experience an improved QOS and from their network service provider.

Figure 3:
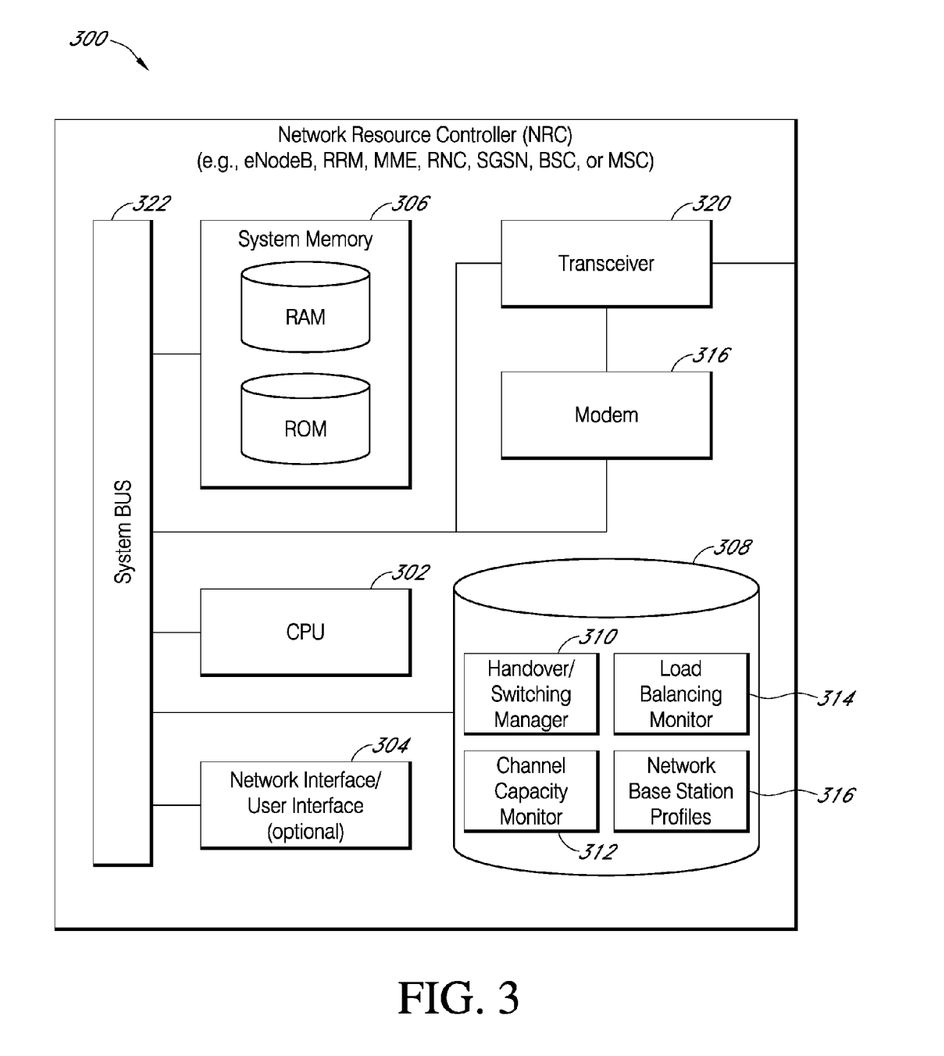
FIG. 3 illustrates a block diagram of a network resource controller (NRC), in accordance with an embodiment of the present invention.

FIG. 3 illustrates a block diagram view of a NRC 300 that may be representative of any of network controller devices 110, 112, and 114 depicted in FIG. 1. In accordance with an embodiment of the present invention, the NRC 300 may be associated with any fixed cell type and it may include, but is not limited to, one or more data processing devices including a central processing unit (CPU) 302. In an embodiment, the CPU 302 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 302 may be responsible for executing all computer programs stored on the NRC's 300 volatile (RAM) and nonvolatile (ROM) system memories, 306 and 308.

The NRC 300 may also include, but is not limited to, a network interface/optional user interface component 304 that can facilitate the NRC's 300 communication with the backhaul 102 portion or the wireless portions of the network computing system 100 of FIG. 1, and may facilitate a user or network administrator accessing the NRC's 300 hardware and/or software resources; a software/database repository 308 including: a handover/switching manager component 310, a channel capacity monitor 312, a load balancing monitor 314, and a repository of network base station profiles 316 that stores base station resource and location information for every network base station the NRC is responsible for controlling; a modem 318 for modulating any analog carrier signal to encode digital information and for demodulating a carrier signal to decode digital information; a wireless transceiver component 320 for transmitting and receiving network communications to and from various network resources, including any of the service provider controller devices 110, 112, and 114, the neighbor network base stations 106a-e, or any of the network user equipment (108a-c, 124, 126a-c, 128, 130, and 132); and a system bus 322 that facilitates data communications amongst all the hardware resources of the NRC 300.

In accordance with an embodiment, the handover/switching manager component 310 of the NRC 300 may be responsible for collaborating with both the channel capacity monitor 312 and the load balancing monitor 314 to determine which network resources (e.g., radio channel capacities) are being efficiently utilized at each registered network base station (e.g., base stations associated with the network base station profiles repository 316), as well as which network resources should be instructed to handover subscriber loads (actively serviced user equipment) to neighboring base stations as a result of employing various load balancing techniques, discussed further herein. In an embodiment, the channel capacity monitor 312 may actively track base station channel resources for each network base station by communicating with each network base station's 400 network resource manager 410.

Figure 4:
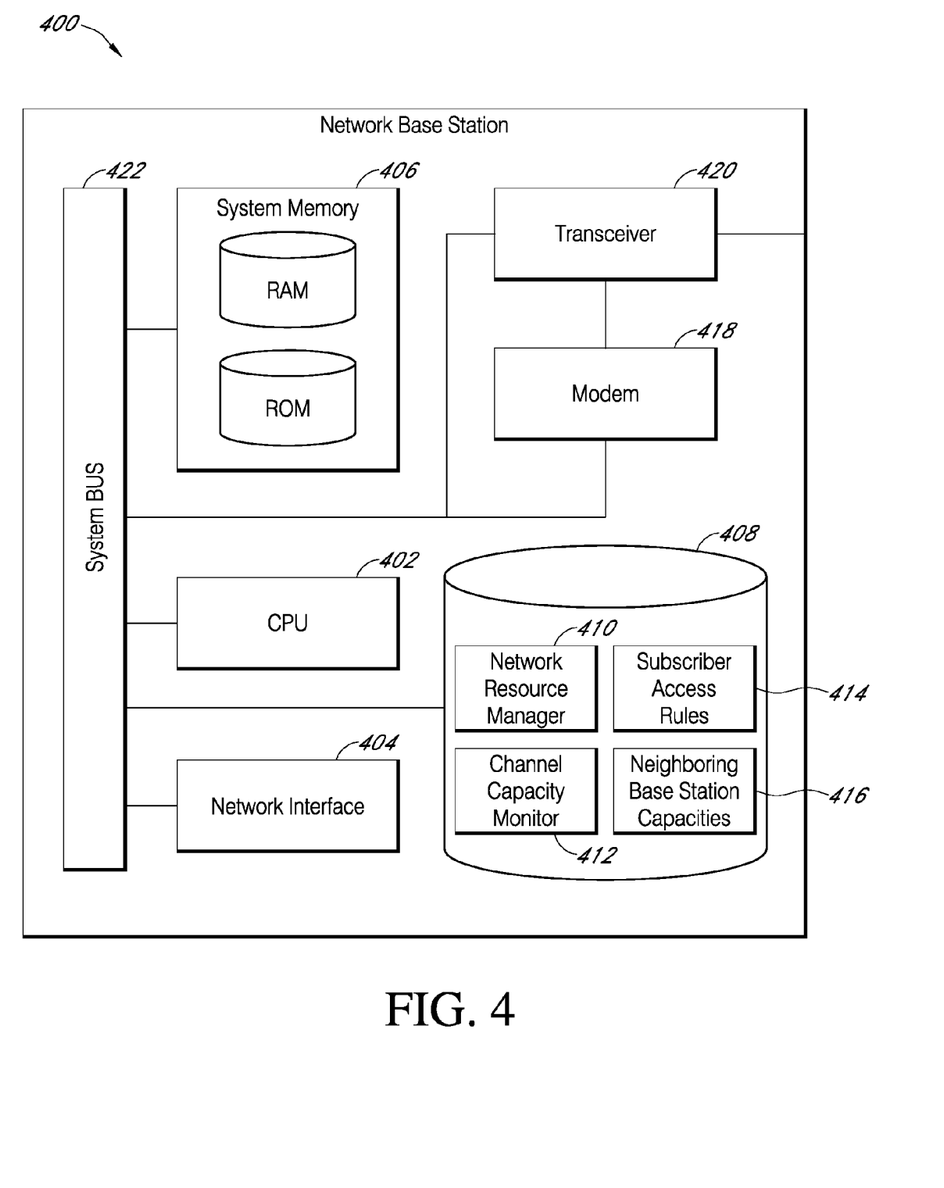
FIG. 4 illustrates a block diagram of a network base station, in accordance with an embodiment of the present invention.

FIG. 4 illustrates a block diagram view of a network base station 400 that could be representative of any of network base stations 106a-e, 204a, 206a, or 208a, depicted in FIG. 1 or 2. In accordance with an embodiment of the present invention, the network base station 400 may include, but is not limited to, one or more data processing devices including a central processing unit (CPU) 402. In an embodiment, the CPU 402 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 402 is responsible for executing all computer programs stored on the network base station's 400 volatile (RAM) and nonvolatile (ROM) system memories, 406 and 408.

The network base station 400 may also include, but is not limited to, a network interface component 404 that can facilitate the network base station's 400 communication with the backhaul 102 portion or the wireless portions of the network computing system 100 of FIG. 1; a modem 418 for modulating an analog carrier signal to encode digital information and for demodulating a carrier signal to decode digital information; a wireless transceiver component 420 for transmitting and receiving wireless communications to and from any of the wireless enabled computing devices (e.g., any of the network base stations 106a-e, or user equipment 108a-i, 110a-b, 112, and 114 of FIG. 1) of the networked computing system 100; a system bus 422 that facilitates data communications amongst all the hardware resources of the network base station 400; a software/database repository 408 including: a network resource manager component 410, a channel capacity monitor 412, a repository of subscriber access rules 414, and a repository of neighboring base station capacities 416.

In accordance with an embodiment of the present invention, the network resource manager component 410 may be configured to communicate with, and collaborate with, one or more service provider controller devices 110, 112, and 114, and/or neighboring base stations 106a-e to affect network handover and load balancing decisions. In an embodiment, the channel capacity monitor 412 may be configured to keep track of the network base station's channel resource capacity. In an embodiment, the repository of subscriber access rules 414 may include service provider or local subscriber access instructions that designate what specific registered users can roam onto the network base station 400 and what usage rules those registered users must conform to when accessing various network resources. In another embodiment (perhaps a more common scenario), the subscriber access rules 414 may be maintained at a core network controller entity, such as a radio resource controller (RRC, not shown), or at any other controller device (e.g., controller device 110, 112, and 114) that may be connected with the network backhaul 102 of FIG. 1. The network base station 400 may also store neighboring base station communications capacities (e.g., information pertaining to a served user load and an available user load capable of being served at a present time), in the repository of neighboring base station capacities 416. At any time, the NRC 300 may require the network base station 400 to provide it with any new or updated information relating to its own capacity or the capacities of neighboring base stations. Alternatively, the network base station 400 may autonomously provide the NRC 300 with any new or updated information relating to its own capacity or the capacities of its neighboring base stations.

In an embodiment, the network base station 400 may use any common modulation/encoding scheme known in the art, including, but not limited to Binary Phase Shift Keying, Quadrature Phase Shift Keying, and Quadrature Amplitude Modulation. Additionally, the network base station 400 may be configured to communicate with the user equipment (e.g., 108a-e, 110a-b, 112, and 114) via any Cellular Data Communications Protocol, including any common LTE™, GSM™, UMTS™, or Wi-Max™ protocol.

In an embodiment, the invention may facilitate a NRC 300 (e.g., any of network controller devices 100, 112, and 114, or alternately a network base station having NRC 300 functionality) autonomously monitoring its network resource usage and, based on that resource utilization information, forecast a remaining number of users which a particular network base station 400 could support in a similar network environment (e.g., if the base station were operating at full capacity). In an embodiment, this capacity determination may be based at least in part on the levels of radio service a network base station 400 is supplying to its active network subscribers. In another embodiment, a network base station 400 in an overlapping coverage cluster (See e.g., the base station clusters depicted in FIGS. 7 and 8) to autonomously increase or decrease its number of active users (e.g., employed as part of a dynamic load balancing algorithm) based on a determination of the base station's 400 own service capacity compared with the service capacity of its neighbor base stations (e.g., any of base stations 106a-e), which may each be independently capable of providing similar communications service to various network user equipment (e.g., any of user equipment 108a-i, 110a-b, 112, and 114) residing in overlapping coverage areas of a wireless network.

In an embodiment, a NRC 300 and/or a network base station 400 may be configured to gather key metrics related to resource usage levels (existing channel capacities) for various network base stations (any of network base stations 106a-e of FIG. 1). The metrics may be utilized to calculate one or more base stations' user capacity in order to facilitate identification of peak usage periods for various network sectors. The metrics may also be used to forecast the remaining user capacities at various clustered network base stations during periods of peak network resource consumption, based on historical user capacity and/or existing user capacity. These metrics may be procured using ordinary resource management software utilities (e.g., utilities employed by a NRC 300, such as the channel capacity and load balancing monitors 312, 314, as well as the handover/switching manager 310) that may be configured to periodically retrieve stored capacity metrics from one or more network base stations or a network metric collection manager (e.g., any of network controller devices 110, 112, and 114) for a particular group or cluster of network base stations (See e.g., FIGS. 7 and 8).

In an embodiment, by analyzing both present and forecast network user capacity, network base stations can negotiate with neighbor base stations to determine one or more user equipment handover assignments, in an effort to load balance network resource capacity across various network areas of overlapping coverage (e.g., areas associated with various network clusters). These service transfer negotiations may proceed via direct or indirect communications links between regional network base stations, and the process may involve altering transmission parameters for one or more network base stations (e.g. by adjusting radio power levels and/or modulation and coding schemes) to grow or shrink a network base station's coverage area and/or user load.

In an embodiment, the any of the radio channel available capacity, forecast maximum radio channel available capacity, neighboring cell negotiation, and network handover processes of the present invention, may involve assistance from user equipment (e.g., any of user equipment 108*a-i*, 110*a-b*, 112, and 114) to determine whether a base station handover is desirable or even possible from a radio coverage perspective. In response to user equipment measurements and feedback, channel parameter adjustments may be made at network base stations 106*a-e*, relating to optimizing transmission power levels and/or modulation levels to affect handover efficiency.

In accordance with an embodiment, at a fairly high level, the present invention may include at least the following processes: a NRC 300 and/or a network base station 400 may gather various network usage metrics; then, the network base station 400 and/or NRC 300 may gather various network service profile statistics; Subsequently, the network base station 400 and/or NRC 300 may derive current user capacity and then estimate a remaining user capacity for various network base stations; the network base station 400 and/or NRC 300 may then report derived capacity metrics to neighboring network base stations 106*a-e*; lastly, the network base station 400 and/or NRC 300 may negotiate with the neighboring base stations to balance available user capacity across base station clusters having overlapping coverage areas.

In accordance with various embodiments of the invention, usage metrics may include, but are not limited to, any of the following: a total number of active user equipment; a total number serviced regional user equipment; an over-subscription ratio (e.g., an overbooking ratio); radio channel throughput; channel usage statistics; radio power levels, and employed modulation and coding schemes. In an embodiment, the usage metrics may be collected periodically (e.g., as often as every few minutes or as infrequently as every couple of days) on a per-channel (or network sector) or per user equipment basis (e.g., when one or more user equipment are utilized to obtain various usage metrics), by a network base station 400, a network resource controller (e.g., a NRC 300), or any other network service provider device (e.g., any of network controllers 110, 112, or 114) or entity.

In an embodiment, a service profile may be associated with various network subscribers. These service profiles may specify "grades" of service each subscriber receives when consuming network bandwidth associated with particular network base stations. Examples of a user or group of user's service profile parameters may include, but are not limited to: a minimum reserved bandwidth; a maximum sustained bandwidth; an unconditionally reserved bandwidth; a monthly traffic limit; a billing type (subscription-base, usage-based, pre-paid billings); a mobile or a fixed service; and an application type (e.g., voice and/or data).

In an embodiment, the service profiles of each active network subscriber may be monitored by a NRC 300 or a network base station 400 to provide further accuracy as to a number of serviced users having various profiled user types with different network resource usage grades. For example, any particular network base station may have different numbers of aggregate users having network usage profiles associated with descending grades of user types, such as: profile A, profile B, profile C, and profile D users. In this embodiment, profile A users may consume the most bandwidth, whereas profile D user may consume the least bandwidth. As can be inferred from this profile grading scenario, a network base station that is servicing a specific number of profile A type subscribers may only be able to service roughly half as many users as a neighboring network base station having similar capacity that is servicing a similar number of profile D subscribers, based on an available network capacity comparison between the two base stations. For example, it may be determined that the base station servicing a specific number of profile A type subscribers is fully loaded, whereas the neighboring base station may be able to handle and additional: 25 profile A type users, or 30 profile B type user, or 40 profile C type users, or 50 profile D type users. Accordingly, based on usage profiles and a corresponding number of users types historically known to be distributed within that network area, it can be forecast roughly how many more users could be accommodated by a neighboring base station, factoring in specific user types that may need to be handed over.

In an embodiment, the usage metrics and service profile information may be collected periodically (e.g., every few minutes for mobile users or once a day for stationary users) on a per-channel basis by a serving base station, NRC 300, or any other network controller device (e.g., any of network controller devices 110, 112, and 114). In an embodiment, user capacity may be a calculated metric that may be based on a formula involving the collected usage metrics and service profile information. For example, an average user throughput could be calculated by dividing the aggregate channel throughput by the number of active users, as follows:

$$\text{Average User Throughput} = \text{Sum of User Throughput}/\text{Number of Active Users}$$

The peak aggregate channel throughput (i.e., a channel capacity) may be calculated using an available user channel size (in terms of frequency-time resources) and the average modulation and coding efficiency across all users. For example, if the minimum user allocation unit is a "slot", a channel might be capable of transporting N slots per second with an average of Mbytes per slot at the average modulation and coding efficiency currently in use on the channel. The peak aggregate channel throughput would be given by the product N×M, as follows:

$$\text{Channel Capacity} = \text{Slot Rate} \times \text{Slot Size}$$

Knowing the channel throughput capacity, the user capacity could be calculated in turn by dividing the aggregate channel throughput by the average user throughput, as follows:

User Capacity=Channel Capacity/Average User Throughput

The remaining user capacity or surplus user capacity may be calculated after the user capacity is determined, as described above. For example, the remaining user capacity could be determined by subtracting the product of the number of active users and average user throughput from the user capacity, as follows:

Remaining User Capacity=User Capacity−(NumActiveUsers×AvgUserThroughput)

In an embodiment, reporting base station capacities may involve pairs of network base stations informing their neighboring base stations of their capacity metrics in periodic messages sent over a backhaul link connecting the base stations or via wireless link. The links between base stations may be direct or indirect, depending on if any intermediary nodes (e.g., a NRC 300 or any of network controller devices 110, 112, or 114 of FIG. 1) are required to facilitate base station to base station communications in a particular network technology.

In an embodiment, once a base station is tracking its own user capacity and that of its neighbors it may be possible for the base station to negotiate with one or more neighboring base stations to either hand off an active user or accept a new user within a regional network cluster. Conditions for making this decision to reallocate a user could be based on a combination of factors, including any of the following considerations: the link quality between the serving base station and the user (e.g., a transmitted power or carrier to interference plus noise ratio); the link quality difference (delta) between the serving and target base stations; the link efficiency (e.g., a modulation and coding scheme; packet error rate, error transmission statistics) between the serving base station and the user; the link efficiency difference (delta) between the serving and target base stations; the remaining user capacity on the serving base station; the remaining user capacity difference (delta) between the serving and target base stations; the assigned type of service profile of the user or users (e.g., the user profile grade(s)), the level of service being delivered to the user.

In an embodiment, any of the above factors may be combined in a number of different ways to form a policy for various service provider assignment decisions as to whether a particular user should be attached to a specific network base station or to one of the base stations neighbor cells sharing an overlapping coverage area. Any of the above factors (e.g., factors A, B, C, . . . ) may be weighted (W) to calculate a numeric score (S) with a defined threshold (T) to determine whether a particular user should remain attached to a base station or not. In an embodiment, this weighting formula may be represented as follows:

$(W_A \times A)+(W_B \times B)+(W_C \times C)+ \ldots = S$, Is $S \geq T$?

In an embodiment, one policy may be to have the base station reduce its transmission power level as it approached a threshold user capacity, in order to force serviced user equipment at the edge of a particular cell to transfer edge loads (represented by one or more active user equipment) to neighboring cells that may proportionally increase their radio power operating level in order to expand their coverage area, if they were determined to have excess user load capacity. In another embodiment, it may be an access provider policy to have a base station raise its minimum modulation and coding level as it approached user capacity, to force user equipment with lower link quality to transfer to one or more neighbor cells that might concurrently lower their modulation and coding threshold in order to attempt to join the user equipment.

Figure 5:
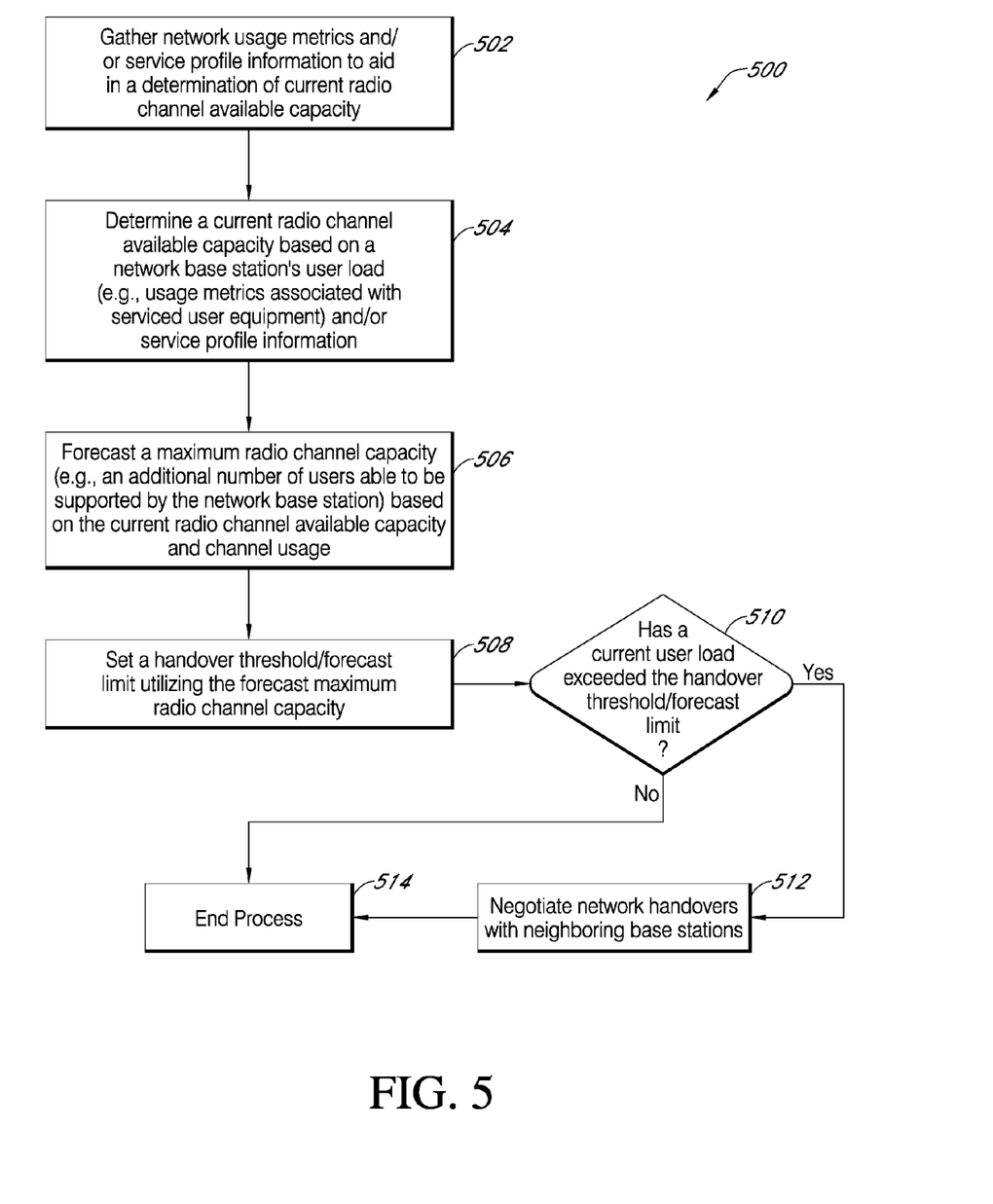
FIG. 5 illustrates a flow diagram depicting radio channel available capacity and forecast maximum radio channel available capacity processes, in accordance with an embodiment of the present invention.

FIG. 5 illustrates a flow diagram 500 depicting radio channel available capacity and forecast maximum radio channel available capacity processes, in accordance with an embodiment of the present invention. It should be understood that this process 500 could be executed using one or more computer-executable programs stored on one or more computer-readable media located on any of the network computing system's 100 base stations 106*a-e*, controller devices 110, 112 and 114, and/or collaboratively on any of the user equipment 108*a-i*, 110*a-b*, 112 and 114 of FIG. 1. At block 502, network usage metrics and/or service profile information is gathered to aid in a determination of current radio channel available capacity. Next at block 504 a current radio channel available capacity is determined based on a particular network base station's user load (e.g., usage metrics associated with serviced user equipment) and/or service profile information. Then at block 506, a maximum radio channel capacity (e.g., an additional number of users able to be supported by the network base station) is forecast, based on the current radio channel available capacity and channel usage. Subsequently, at block 508 a handover threshold/forecast limit is set utilizing the forecast maximum radio channel capacity. The process then proceeds to decision block 510 where it is determined if a current user load has exceeded the handover threshold/forecast limit set in block 508. If the current user load has exceeded the handover threshold/forecast limit, then the process proceeds to block 512, where the network handovers between the network base station and one or more neighboring base stations are negotiated. Subsequently, the process ends at block 514. However, if it is determined at decision block 510 that the current user load has not exceeded the handover threshold/forecast limit, then the process ends to block 514.

Figure 6:
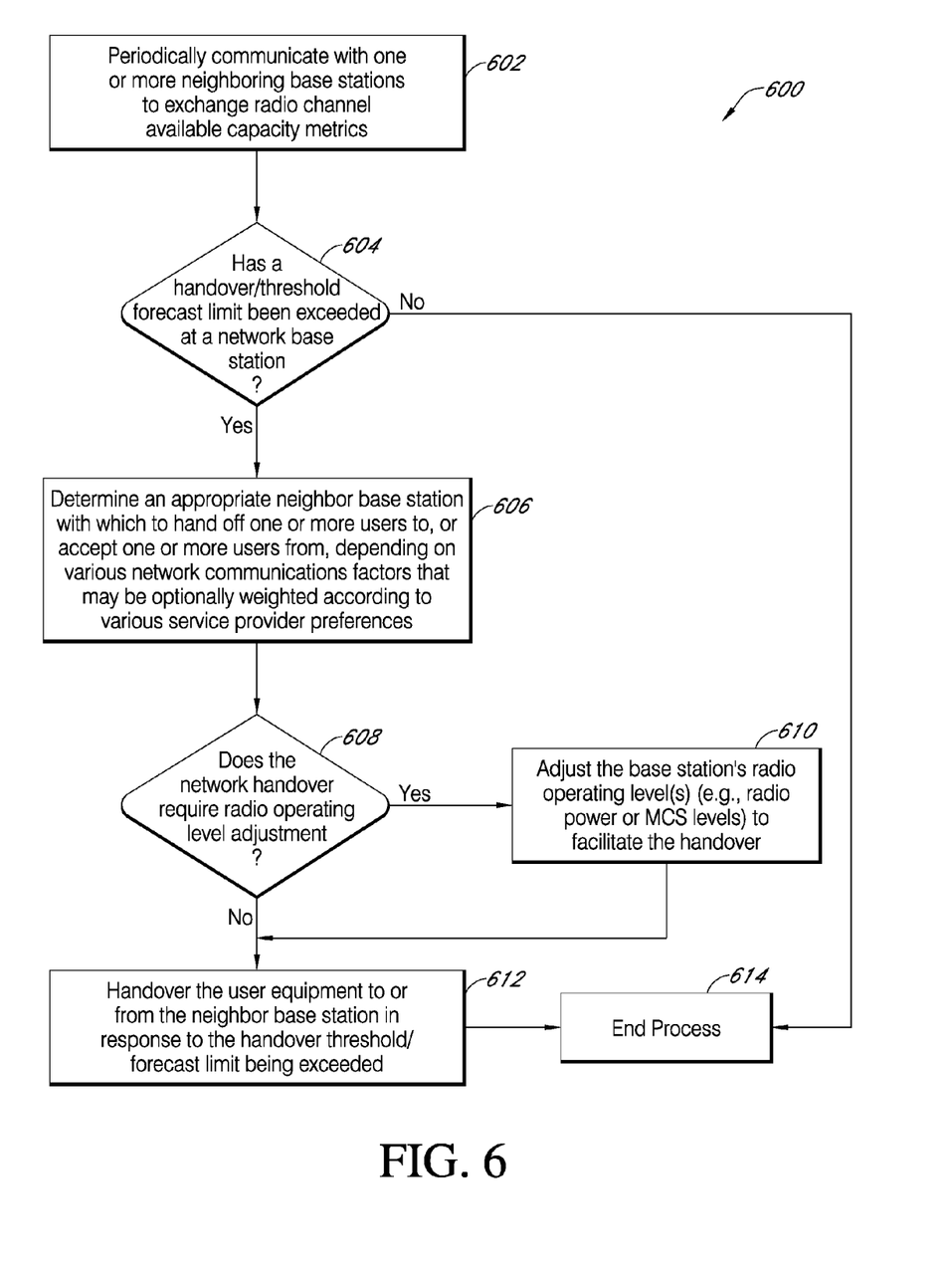
FIG. 6 illustrates a flow diagram depicting radio channel available capacity, forecast maximum radio channel available capacity, and network handover processes, in accordance with an embodiment of the present invention.

FIG. 6 illustrates a flow diagram 600 depicting radio channel available capacity, forecast maximum radio channel available capacity, and network handover processes, in accordance with an embodiment of the present invention. It should be understood that this process 600 could be executed using one or more computer-executable programs stored on one or more computer-readable media located on any of the network computing system's 100 base stations 106*a-e*, controller devices 110, 112 and 114, and/or collaboratively on any of the user equipment 108*a-i*, 110*a-b*, 112 and 114 of FIG. 1. At block 602, a network base station periodically communicates with one or more neighboring base stations to exchange radio channel available capacity metrics. Next at decision block 604 it is determined if a network handover/threshold forecast limit has been exceeded at a network base station. If it is determined that a network handover/threshold forecast limit has not been exceeded at a network base station, then the process ends at block 614. However, it is determined at decision block 604 that a network handover/threshold forecast limit has been exceeded at a network base station, then the process proceeds to block 606, where an appropriate neighbor base station with which to hand off one or more users to or accept one or more users from, is determined, depending on various network communications factors that may be optionally weighted according to various server provider preferences. Subsequently at decision block 608, it is determined if the network handover requires radio operating level adjustment. If the network handover does require radio operating level adjustment, then the process proceeds to block 610 where one or more of the base station's radio operating levels (e.g., radio power or MCS levels) is appropriately adjusted to facilitate the handover. Subsequently, the process proceeds to block 612. However, if at decision block 608 it is determined that the network handover does require radio operating level adjustment, then the process proceeds to block 612 where user equipment is handed over to or from the neighbor base station in response to the handover threshold/forecast limit being exceeded. Subsequently, the process ends at block 614.

Figure 7:
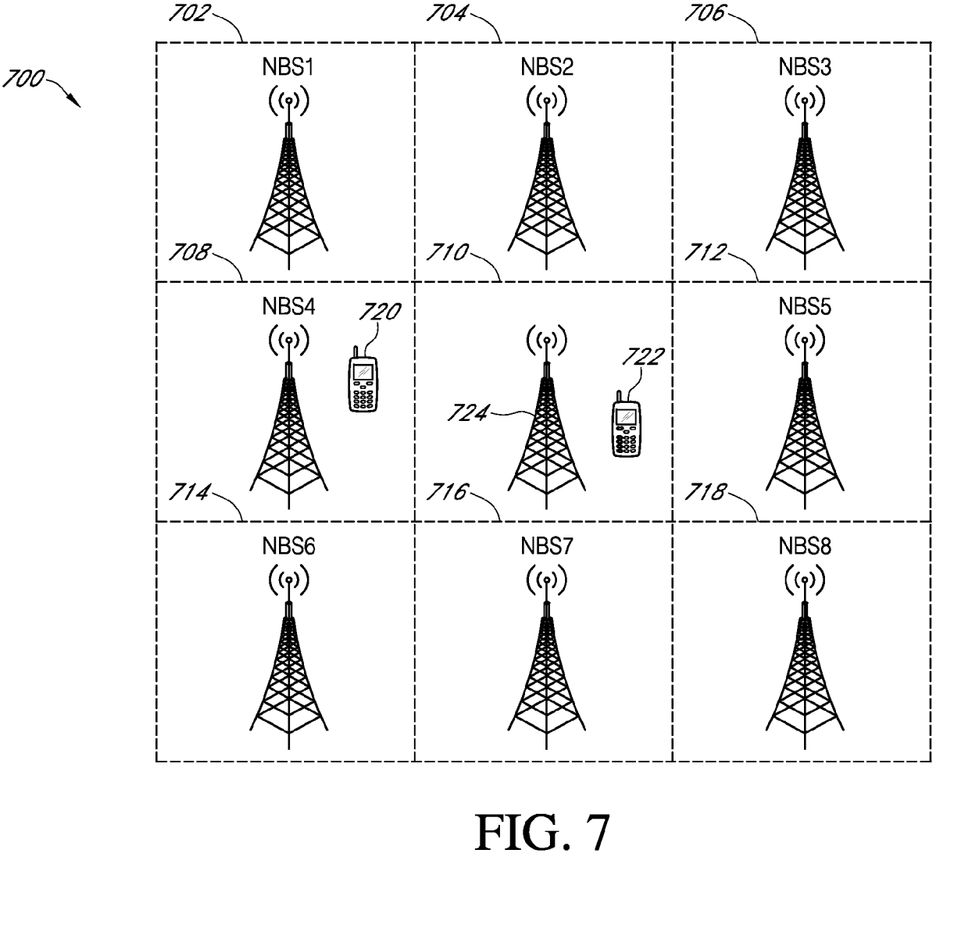
FIG. 7 illustrates a system diagram depicting a network cell topology where a central base station is surrounded by multiple neighboring base stations in a network cluster, in accordance with an embodiment of the present invention.

FIG. 7 illustrates a system diagram 700 depicting a network cell cluster where a central base station 724 residing in a network cell 710 is surrounded by multiple neighboring cell boundaries 702, 704, 706, 708, 712, 714, 716, and 718 (comprising neighboring base stations NBSs1-8) in a network base station cluster topology, in accordance with an embodiment of the present invention. They system diagram 700 further depicts user equipment 722, being serviced by NBS4, within network cell boundary 710, as well as user equipment 720, being serviced by network base station 724, within network cell boundary 710. Assuming that neither base station 724 nor NBS4 is overloaded, both user equipment 720 and 722 may continue to be serviced by their existing serving base stations, until a service capacity threshold of either base station 724 and/or NBS4 has been reached or exceeded by a regional user load.

Figure 8:
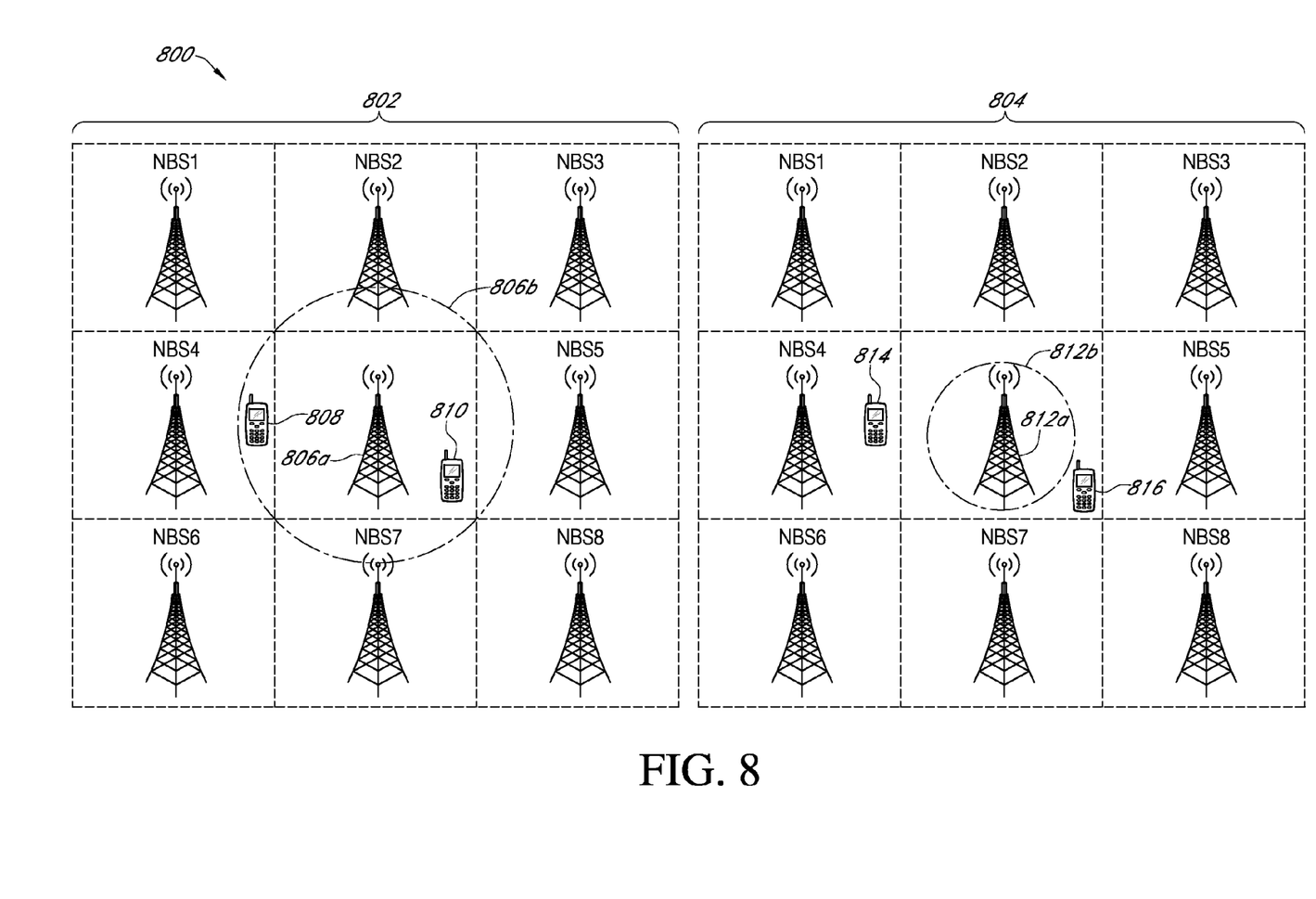
FIG. 8 illustrates system diagrams depicting autonomous load-balancing scenarios where network cells in a network cluster alternately shrink or grow their coverage area to facilitate user equipment handovers, in accordance with an embodiment of the present invention.

FIG. 8 illustrates a system diagram 800 depicting two separate autonomous load-balancing scenarios 802 and 804 where network cells in a network cluster alternately grow or shrink their coverage area (e.g., by increasing or decreasing their respective radio operating levels, related to radio power and/or MCS) to facilitate user equipment handovers, in accordance with embodiments of the present invention. In another embodiment, an alternate load balancing scenario may not require increasing or decreasing coverage areas to affect a service handover. In this scenario, a base station (e.g., network base station 300) or controller device (e.g., NRC 300) may simply instruct one or more user equipment (e.g., any of user equipment 108a-i, 110a-b, 112, and 114) within an overlapping network coverage area to simply "leave", by transfering service to another regional network base station having more user capacity than their previous serving base station. In this way, a network base station may not need to adjust its radio coverage area to affect load balancing amongst networked user devices.

In load balancing scenario 802, a NRC 300 or a network base station 400 (e.g., any of NBSs1-8 or base station 806a) may determine that a network base station NBS 4 may be overloaded and that base station 806a may have excess user capacity to handle the existing load of user equipment 810 along with the new load of user equipment 808, based on the service profiles associated with the subscribers respectively using user equipment 808 and 810. In this scenario, base station 806a may be configured to grow its coverage area 806b (e.g., by increasing is radio power level) to service user equipment 808, which was previously being serviced by NBS4. In load balancing scenario 804, a NRC 300 or a network base station 400 (e.g., any of NBSs1-8 or base station 812a) may determine that a network base station 812a may be overloaded and that any of neighboring base stations NBS5, NBS7, or NBS8 may have excess user capacity to handle the new load of user equipment 816 (in this scenario user equipment 814 will maintain its service from NBS4), based on the service profile associated with the subscriber using user equipment 816. In this scenario, base station 812a may be configured to shrink its coverage area 812b (e.g., by decreasing is radio power level) to drop to user equipment 816, such that the least loaded of base stations NBS5, NBS7, or NBS 8 may add user equipment 816 to is group of serviced user equipment.

In an embodiment, in scenario 802 base station 806a has coverage that initially includes and user equipment 810 and excludes user equipment 808. The base station 806a may communicate with each of its neighbor base stations to determine that a particular neighbor base station NBS4 is nearing user capacity, whereas the base station 806a has ample remaining user capacity and can also provide service to the user equipment 808. In this scenario 802, user equipment 816, which was formerly within the coverage area of the neighbor base station NBS4 has been handed off to base station 806a, effectively expanding its coverage area 806b. In scenario 804 a user equipment 816 formerly within the coverage area 812b of a base station 812a has been handed off to a neighbor base station by effectively shrinking its coverage area 812b to facilitate a handover.

In an embodiment associated with a use case scenario facilitated by the present invention, an employee of a wireless access operator may need to provide a sales and marketing team with guidance as to which portions of its deployed network are under-utilized and how much subscriber growth the network may be able to absorb before reaching full capacity. The employee may elect to use an element management system to access historical data calculated by the base stations which detail the current capacity in number of users during peak (e.g. daily) usage periods for the preceding month. The employee can similarly view the forecast remaining capacity in users for the period. The employee may use the data to quickly put together a summary report showing the current network capacity and forecast remaining capacity which the sales and marketing team will use to form their new subscriber acquisition plan.

In an embodiment associated with a use case scenario facilitated by the present invention, a base station in a wireless network may be located in a cell coverage cluster. The base station may periodically calculate the current number of users and their usage of critical base station resources (e.g., channel bandwidth, channel modulation efficiency, base station processor cycles, backhaul bandwidth). The base station may also maintain information relating to which base network stations are neighbors with overlapping radio coverage as well as each network base station's reported remaining capacity. As the base station nears its peak capacity, it may attempt to offload some of its users (e.g. those with weaker signal coverage) to its neighbor base stations that are reporting remaining user capacity. This may result in some base station cells shrinking in size or occupancy while others grow or increase in occupancy.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A networked computing system for determining the radio channel capacities of regional network base stations to affect service handovers, comprising:
    a plurality of network base stations;
    a plurality of user equipment;
    at least one network resource controller; and
    a data communications network facilitating data communications amongst the plurality of network base stations, the plurality of user equipment, and the at least one network resource controller,
wherein the network resource controller is configured to:
determine a current radio channel available capacity based on a user load associated with regional user equipment;
forecast maximum radio channel capacity based on the current radio channel available capacity; and
determine a number of additional user equipment a network base station can support based on the forecasted maximum radio channel capacity,
wherein the user load associated with the regional user equipment is related to network resource consumption habits of an average network user that a network base station services; wherein the network resource controller is further configured to determine a handover threshold utilizing the forecast maximum radio channel capacity; and wherein when a first network base station's number of users exceeds the handover threshold, at least one user equipment that the first network base station services, is handed over to a second network base station with better service capacity.

2. The networked computing system of claim 1, wherein the forecast maximum radio channel capacity is related to a predicted number of network users that a network base station will provide service to.

3. The networked computing system of claim 1, wherein the network resource controller is further configured to:
utilize the forecast maximum radio channel capacity to determine if a network base station is to increase or decrease a radio operating level to add or drop service to at least one user equipment, whereby a cell coverage area of the network base station is increased or decreased according to the radio operating level.

4. The network computer system of claim 1, wherein the network resource controller is further configured to:
calculate a user capacity of the base station based on the current radio channel capacity and an average user throughput, the user capacity being a number of users the base station is predicted as being able to service.

5. A non-transitory computer-readable medium encoded with computer-executable instructions for affecting a service handover, which when executed, performs a method comprising:
determining a current radio channel capacity of a base station based on a user load associated with user equipment;
calculating a user capacity of the base station based on the current radio channel capacity and an average user throughput, the user capacity being a number of users the base station is predicted as being able to service; and
forecasting a remaining user capacity based on the calculated user capacity, the remaining user capacity being a number of additional users the base station is predicted as being able to service; wherein the average user throughput is calculated by dividing an aggregate channel throughput of the base station by a number of active users joined to the base station; and wherein the remaining user capacity is determined by subtracting a product of a number of active users joined to the base station and the average user throughput from the user capacity.

6. The non-transitory computer-readable medium of claim 5, wherein the user load associated with the user equipment is related to network resource consumption habits of an average user serviced by the base station.

7. The non-transitory computer-readable medium of claim 5, wherein the method further comprises:
determining a handover threshold utilizing the forecasted remaining user capacity.

8. The non-transitory computer-readable medium of claim 7, wherein when the base station's number of users exceeds the handover threshold, at least one user equipment served by the base station is handed over to an adjacent base station.

9. The non-transitory computer-readable medium of claim 5, wherein the method further comprises:
utilizing the forecasted remaining user capacity to determine if the base station is to increase or decrease its radio coverage area in order to add or drop service to at least one user equipment.

10. A computer-implemented method for affecting service handovers, the method comprising:
determining a current radio channel capacity of a base station based on a user load associated with user equipment;
calculating a user capacity of the base station based on the current radio channel capacity and an average user throughput, the user capacity being a number of users the base station is predicted as being able to service; and
forecasting a remaining user capacity based on the calculated user capacity, the remaining user capacity being a number of additional users the base station is predicted as being able to service; wherein the average user throughput is calculated by dividing an aggregate channel throughput of the base station by a number of active users joined to the base station, and wherein the remaining user capacity is determined by subtracting a product of a number of active users joined to the base station and the average user throughput from the user capacity.

11. The computer-implemented method of claim 10, wherein the remaining user capacity is determined by subtracting a product of a number of active users joined to the base station and the average user throughput from the user capacity.

12. The computer-implemented method of claim 10, wherein the user load associated with the regional user equipment is related to network resource consumption habits of an average network user that the network base station services.

13. The computer-implemented method of claim 10, wherein the method further comprises:
determining a handover threshold utilizing the forecasted remaining user capacity.

14. The computer-implemented method of claim 13, wherein when the base station's number of users exceeds the handover threshold, at least one user equipment joined to the base station is handed over to an adjacent base station by adjusting a radio coverage area of the base station, or a radio coverage area of the adjacent base station, or both.

* * * * *